United States Patent [19]

Takanashi et al.

[11] Patent Number: 4,614,965

[45] Date of Patent: Sep. 30, 1986

[54] COLOR CAMERA WITH STRIPE FILTER USING TWO CONTROLLABLE BIAS LIGHTS FOR IMPROVING COLOR REPRODUCIBILITY IN DARK SCENES AND REDUCING AFTERIMAGES

[75] Inventors: Itsuo Takanashi, Yokohama; Shintaro Nakagaki, Fujisawa; Takashi Kuriyama, Tokyo, all of Japan

[73] Assignee: Victor Company of Japan, Limited, Yokohama, Japan

[21] Appl. No.: 555,864

[22] Filed: Nov. 28, 1983

[30] Foreign Application Priority Data

Nov. 30, 1982 [JP] Japan ............................ 57-181416[U]

[51] Int. Cl.⁴ ...................... H04N 9/077; H04N 9/07; H04N 9/09; H04N 5/228
[52] U.S. Cl. ...................................... 358/44; 358/43; 358/55; 358/223
[58] Field of Search .................. 350/173; 358/55, 225, 358/41, 43, 44, 47, 50, 52, 223

[56] References Cited

U.S. PATENT DOCUMENTS

| 3,590,145 | 6/1971 | Schneider et al. | 358/52 |
| 3,846,579 | 11/1974 | Takanashi et al. | 358/47 |
| 4,143,399 | 3/1979 | Nagahara et al. | 358/44 |
| 4,145,722 | 3/1979 | Takeuti et al. | 358/223 |
| 4,422,722 | 12/1983 | Higuchi et al. | 358/55 |

FOREIGN PATENT DOCUMENTS 186285  10/1983  Japan ................................ 358/55

Primary Examiner—James J. Groody
Assistant Examiner—Randall S. Svihla
Attorney, Agent, or Firm—Jordan and Hamburg

[57] ABSTRACT

A color TV imaging apparatus has a color TV imaging device which generates a multiplex color TV video signal by means of a photoelectric transducer section equipped with a color separation stripe filter. A first bias light supply device is located in a front portion of the imaging device where the transducer section is formed, in order to apply first bias light which improves color reproducibility in dark scenes. Disposed in a rear portion of the imaging device is a second bias light supply device which applies second bias light to the transducer section which reduces afterimages. The quantity of the second bias light is predetermined to be larger than that of the first bias light.

5 Claims, 7 Drawing Figures

4,614,965

COLOR CAMERA WITH STRIPE FILTER USING TWO CONTROLLABLE BIAS LIGHTS FOR IMPROVING COLOR REPRODUCIBILITY IN DARK SCENES AND REDUCING AFTERIMAGES

BACKGROUND OF THE INVENTION

Reference is made to copending U.S. patent application Ser. No. 555,863 filed Nov. 28, 1983 and Ser. No. 555,865 filed Nov. 28, 1983.

The present invention relates to a color television (TV) imaging apparatus which includes a color TV imaging device constructed to generate a multiplex color TV video signal by use of a color separation stripe filter. More particularly, the present invention is concerned with a color TV imaging apparatus of the type having a first bias light supply device for improving color reproducibility in dark scenes and a second bias light supply device for reducing afterimages.

A modern color TV camera employs a color TV imaging device in which a color separation stripe filter is disposed in a photoelectric transducer section to generate multiplex color TV video signals. Typical of such color TV cameras is a single tube type color TV camera which uses as its imaging device an image tube having a photoelectric transducer section with a color separation stripe filter, or a single plate type color TV camera whose imaging device is a solid state image sensor having a photoelectric transducer section with a color separation stripe filter. Because such types of TV cameras are easy to produce in a simple, compact and light-weight construction, various types of products with such capabilities are now in the market.

In a color separation stripe filter of the type described, a plurality of color stripes are arranged in a predetermined repetition mode, at least one kind of the stripes being in a complementary color with respect to a primary color. Generally, a color TV camera comprises a color TV imaging device using the stripe filter to generate a multiplex color TV video signal, and at least two demodulators for producing color signal components by demodulating color signals, or carrier color signals as will be referred to which are contained in an output signal of the imaging device and processed into carriers. The imaging element includes a photoconductive layer in the photoelectric transducer section.

As well known in the art, an undesirable afterimage (image persistence) develops in a color TV imaging device of the type including in a photoelectric transducer section thereof a photoconductive layer which shows a photoelectric phenomenon, a kind of internal photoelectric effects. An expedient heretofore employed to reduce afterimage in such an imaging device is applying bias light in an even distribution to the entire surface of the transducer section. Another problem encountered with a color TV imaging apparatus employing a color separation stripe filter is that color reproducibility is lowered when dark scenes are picked up.

As a result of extended study in search of a solution to the problem of the poor reproducibility, we found that it can be alleviated by supplying bias light to the transducer section of the color TV imaging device in a quantity and at a color temperature which are selected such that the carrier color signals to be demodulated remain greater than the peak-to-peak value of noise applied to demodulators. However, if the quantity and/or color temperature of the bias light is varied with the passage of time, white balance is apt to be destroyed or color reproducibility is apt to be degraded. Further, the bias light should not be of the kind which can not reduce undesirable shading caused by the use of the color separation stripe filter and particularly noticeable in dark scenes.

It is desirable, therefore, that a minimum necessary quantity of bias light be used. Should a large quantity of bias light be selected, the change in the quantity of bias light with the passage of time would also be magnified to pronounce the disturbance in white balance, while the possibility of shading in dark scenes would be increased. However, where a minimum quantity of light required for suppressing deterioration of the color reproducibility in dark scenes is selected for the above reason, the afterimage in the transducer section cannot be favorably reduced. Thus, there has been a keen demand for a solution which reconciles reduction of afterimages and improvement in color reproducibility in dark scenes.

SUMMARY OF THE INVENTION

It is therefore an object of the present invention to provide a color TV imaging apparatus which achieves both improvement in color reproducibility in dark scenes and reduction of afterimages.

It is another object of the present invention to provide a color TV imaging apparatus which eliminates shading in dark scenes.

It is another object of the present invention to provide a generally improved color TV imaging apparatus.

A color television imaging apparatus for improving color reproducibility in dark scenes according to the present invention comprises a color television imaging device for generating a multiplex color television video output signal by means of a photoelectric transducer section which includes a color separation stripe filter, first bias light supply device for applying a first bias light, which improves color reproducibility in dark scenes, to the transducer section of the imaging device through the stripe filter, the first bias light supply device being located in front of the transducer section which is positioned in a front portion of the imaging device, and second bias light supply device for applying a second bias light, which reduces afterimages, to the transducer section of the imaging device, the second bias light supply device being located in a rear portion of the imaging device and facing the transducer section.

The above and other objects, features and advantages of the present invention will become apparent from the following detailed description taken with the accompanying drawings.

DESCRIPTION OF THE PREFERRED EMBODIMENT

While the color TV imaging apparatus of the present invention is susceptible of numerous physical embodiments, depending upon the environment and requirements of use, a substantial number of the herein shown and described embodiment have been made, tested and used, and all have performed in an eminently satisfactory manner.

Reference will be made to the accompanying drawings for describing a color TV imaging apparatus of the present invention.

Figure 1:
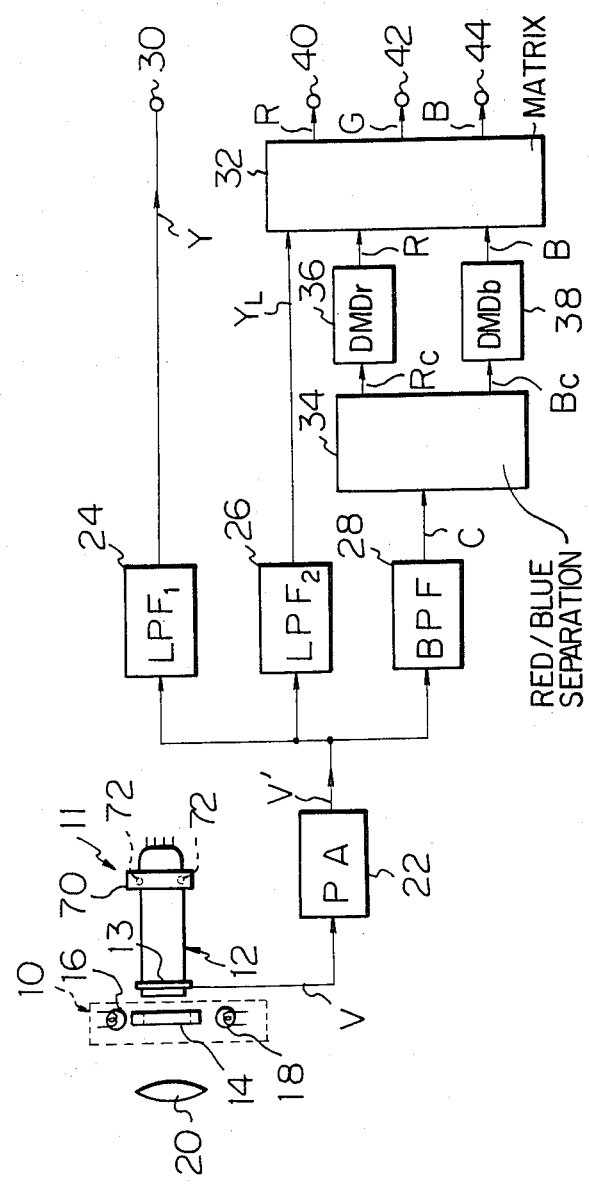
FIG. 1 is a block diagram of a color TV imaging apparatus embodying the present invention.
Figure 2:
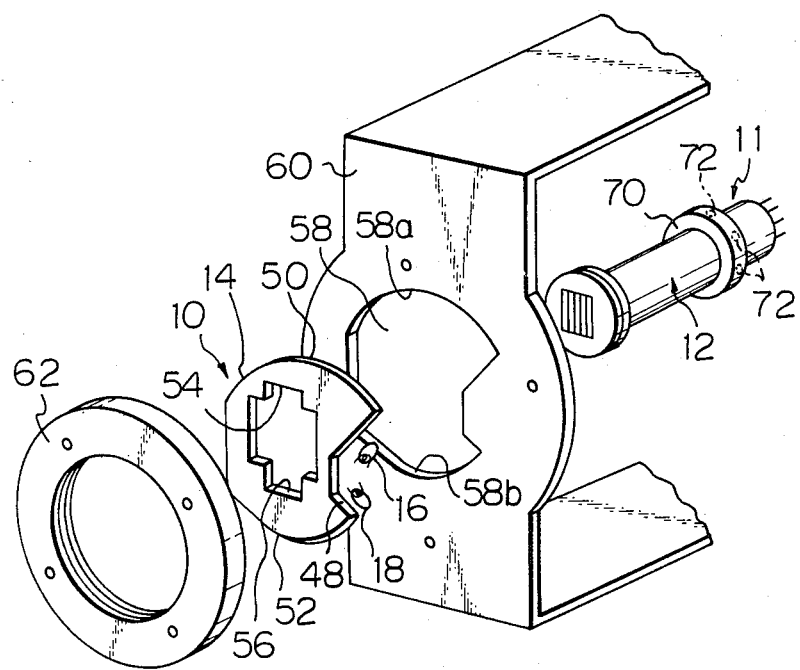
FIG. 2 is an exploded perspective view of essential part of a color TV camera.

The imaging apparatus is shown in a block diagram in FIG. 1 and in a fragmentary exploded perspective view in FIG. 2. An example of a first bias light supply device forming part of the apparatus of the present invention is shown in a perspective view in FIG. 3. In the illustrated embodiment, an imaging device comprises an image tube by way of example.

As shown in FIG. 1, the imaging apparatus of the present invention includes a first bias light supply device 10 for emitting bias light adapted to improve color reproducibility in dark scenes, and a second bias light supply device 11 for emitting bias light adapted to reduce afterimages. The first bias light supply device 10 applies bias light to a photoelectric transducer section 13 of a color TV imaging device 12 through a color separation stripe filter (not shown). In response to the bias light, the imaging device 12 produces an output signal which contains carrier color signals. The second bias light supply device 11 is constructed and arranged to apply bias light in an even distribution to the entire surface of the transducer section 13 from behind.

The image of an object is focused by a lens 20 to a photoconductive layer in the transducer section 13 of the image tube 12 through a color separating stripe filter (not shown) which is disposed adjacent to the front surface of the transducer section 13. The image tube 12 produces a color multiplex TV video signal V which is then applied to a preamplifier 22.

The video signal V' output from the preamplifier 22 is fed to a first low pass filter 24 for providing a wide band luminance signal, a second low pass filter 26 for providing a narrow band luminance signal, and a band pass filter 28 for extracting a high frequency signal (carrier color signal). The first low pass filter 24 delivers a luminance signal Y to a terminal 30, the second low pass filter 26 delivers a narrow band luminance signal $Y_L$ to a matrix circuit 32, and the band pass filter 28 extracts a carrier color signal C and applies it to a red and blue (RB) separation circuit 34.

The RB separation circuit or separator 34 separates the input color signal C into a carrier red signal Rc and a carrier blue signal Bc which are applied to demodulators 36 and 38 respectively. The demodulator 36 supplies the matrix circuit 32 with a red signal R, and the demodulator 38 supplies the matrix circuit 32 with a blue signal B. The matrix circuit 32 processes the incoming narrow band luminance signal $Y_L$, red signal R and blue signal B to generate signals representative of three primary colors, red, green and blue. The red, green and blue signals are applied to output terminals 40, 42 and 44 respectively. Further detailed explanation of this type of color signal processing circuit per ce may be found in the U.S. patent specification 3,846,579.

In the color TV imager of the present invention, color reproducibility in dark scenes is improved by presetting one or both of quantity and color temperature of bias light applied from the device 10 to the transducer section 13 of the imaging device 12 through the filter, such that the carrier color signals applied to the demodulators 36 and 38 (carrier red signal Rc and carrier blue signal Bc in this embodiment) individually become greater than the peak-to-peak value of noise appearing at the input terminals of the demodulators 36 and 38.

Figure 3:
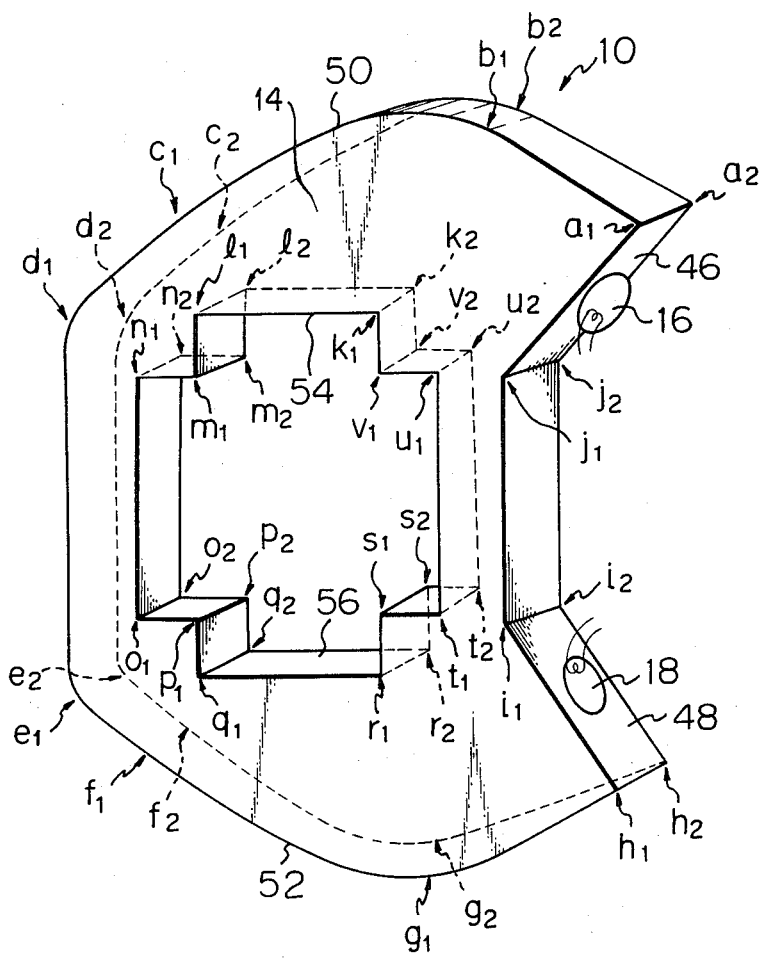
FIG. 3 is a perspective view of a first bias light supply device included in the apparatus of FIG. 1.

Referring to FIGS. 2 and 3, an example of the first bias light supply device 10 is shown. In FIG. 3, the flat light conducting member or light conductor 14 is made of a light transmitting material such as acrylic resin or glass. As shown, the light conductor 14 comprises light inlet portions 46 and 48 on which rays emanating from the light sources 16 and 18 become incident respectively, reflective portions 50 and 52 each having a parabolic section for reflecting the light rays incident on the light inlet portion 46 or 48 associated therewith, and light outlet portions 54 and 56 at which the light rays reflected by the portions 50 and 52 leave the light conductor 14. Light from the light source 16 enters the light conductor 14 at the light inlet portion 46 and leaves it as bias light at the light outlet portion 54 reflected by the reflective portion 50. Likewise, light from the light source 18 propagates through the light inlet portion 48, reflective portion 52 and light outlet portion 6, leaving the light conductor 14 as bias light. While two light sources 16 and 18 are shown in the embodiment of FIG. 3, an arrangement may be made such that the two paths for light propagation are supplied by a single light source.

It is a primary requisite that the light rays from the light sources 16 and 18 be directed only toward the light inlet portions 46 and 48 of the light conductor 14, that is, light rays issuing in directions other than that toward the light inlet portions 46 and 48 be prevented from leaking to the outside. This is readily attainable by arranging the configuration of the lamps 16 and 18 themselves or that of a lamp housing (not shown). Meanwhile, the portions of the light conductor 14 other than the light inlet portions 46 and 48, light outlet portions 54 and 56 and reflective portions 50 and 52 are entirely coated black for light interception, so that unnecessary light rays may be prevented from leaking to the outside.

In detail, the black coating for light interception is applied to all the portions other than the light inlet portions 46 (area defined by points $a_1$, $a_2$, $j_2$ and $j_1$) and 48 (area defined by points $h_1$, $h_2$, $i_2$ and $i_1$), light outlet portions 54 (area defined by points $l_1$, $k_1$, $k_2$ and $l_2$), and 56 (area defined by points $q_1$, $r_1$, $r_2$ and $q_2$), and reflective portions 50 (area defined by points $b_1$, $b_2$, $c_2$ and $c_1$) and 52 (area defined by points $g_1$, $g_2$, $f_2$ and $f_1$), i.e., an area defined by points $j_1$, $i_1$, $i_2$ and $j_2$, an area defined by points $b_1$, $a_1$, $a_2$ and $b_2$, an area defined by points $g_1$, $h_1$, $h_2$ and $g_2$, an area defined by points $c_1$, $d_1$, $e_1$, $f_1$, $f_2$, $e_2$, $d_2$ and $c_2$, an area defined by points $k_1$, $v_1$, $u_1$, $t_1$, $s_1$, $r_1$, $r_2$, $s_2$, $t_2$, $u_2$, $v_2$ and $k_2$, an area defined by points $l_1$, $m_1$, $n_1$, $o_1$, $p_1$, $q_1$, $q_2$, $p_2$, $o_2$, $n_2$, $m_2$ and $l_2$, an area defined by a curve interconnecting points $a_1$, $b_1$, $c_1$, . . . , $g_1$, $h_1$, $i_1$, $j_1$ and $a_1$ and a curve interconnecting points $k_1$, $l_1$, $m_1$, $n_1$, $o_1$, . . . , $t_1$, $u_1$, $v_1$ and $k_1$, and an area defined by a curve interconnecting points $a_2$, $b_2$, $c_2$, $d_2$, . . . , $g_2$, $h_2$, $i_2$, $j_2$ and $a_2$ and a curve interconnecting points $k_2$, $l_2$, $m_2$, $n_2$, $o_2$, ..., $t_2$, $u_2$, $v_2$ and $k_2$.

The flat light conducting element 14 is coupled in an opening 58 which is formed through a wall of a camera housing or box 60, as shown in FIG. 2. The position of the light conductor 14 is such that its opposite major surfaces extend parallel to the surface of the photoelectric transducer section of the image tube (color TV imaging device) 12. Among all the walls which define the opening 58, those 58a and 58b corresponding to the reflective portions 50 and 52 of the light conductor 14 are finished to mirror surface so that the light rays entering the light conductor 14 may be efficiently reflected by the portions 50 and 52 toward the light outlet portions 54 and 56 respectively, when the light conductor 14 is fit in the opening 58. It will be apparent to those skilled in this art that light reflecting films may be evaporated or otherwise deposited on the outer surfaces of the reflective sections 50 and 52.

The opening 58 in the camera casing 60 is of course configured with notches which individually match in shape with the portions of the light conductor 14 where the light sources 16 and 18 are mounted. This allows the light sources 16 and 18 to be accommodated in the opening 58 when the light conductor 14 is coupled thereinto. The reference numeral 62 in FIG. 2 designates a lens mount which is fastened to the camera casing 60 by means of screws. The lens mount 62 is a C-mount.

As previously mentioned, the opposite major surfaces of the light conductor 14 extend parallel to the surface of the photoelectric transducer section of the imaging device 12. Each of the light outlet portions 54 and 56 of the light conductor 14 is oriented such that the light projected therefrom proceeds within a plane which is parallel to stripes in the color separation filter and perpendicular to the photoelectric transducer section surface, as shown in FIGS. 6 and 7.

Figure 6:
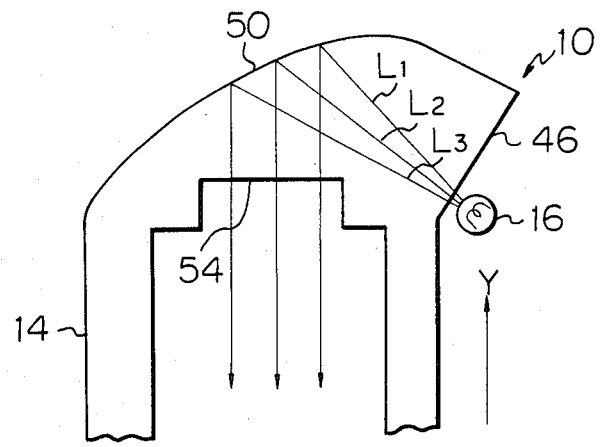
FIGS. 6 and 7 are diagrams illustrating a manner of bias light propagation in a light conducting member of a the first bias light supply device.
Figure 7:
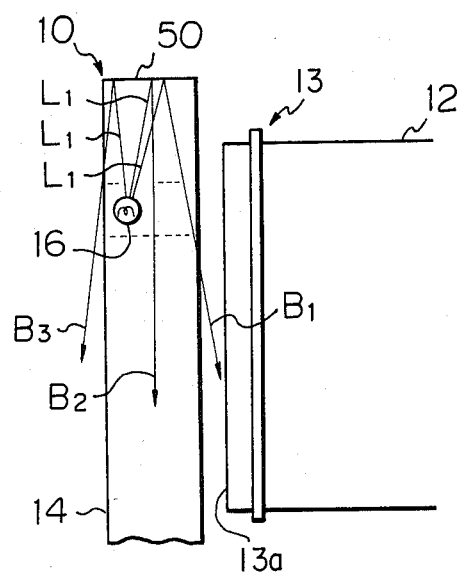

In detail, as shown in FIG. 6, the light source 16 is positioned adjacent to the focus of the parabolic section which constitutes the reflective portion 50 of the light conductor 14. Light rays $L_1$, $L_2$ and $L_3$ emanating from the light source 16 are individually reflected by the reflective portion 50 to be radiated from the light outlet portion 54 (light rays from the other light source 18 are steered in the same manner and, therefore, description thereof will be omitted for simplicity). The light rays coming out from the light conductor 14 respectively propagate along planes which are perpendicular to the sheet surface of FIG. 6 and parallel to a direction Y, that is, parallel to the stripes in the stripe filter and intersecting the face 11a of the transducer section 11 (shown in FIG. 7), at a right angle. FIG. 7 illustrates the propagation of the light ray $L_1$, for example, as viewed from a side of the light conductor 14. As shown in FIG. 7, the light ray $L_1$ reflected by the portion 50 advances in various different directions in the specific plane described above. The reflected light includes a component $B_1$ advancing toward the face 13a of the transducer section 13, a component $B_2$ advancing along the general direction in which the light conductor 14 extends, and a component $B_3$ advancing away from the face 13a of the transducer section 13. In accordance with the present invention, only the light component $B_1$ serves as effective bias light. In order that the specific component $B_1$ may be efficiently routed toward the face 13a of the transducer section 13, it is preferable to, for example, position the light source 16 offset toward the front end of the light conductor 14 as shown in FIG. 7. Where the light source 16 is a lamp, its filament may be disposed in such a manner as to attain the above-described effect. Under this condition, the bias light coming out from the light conductor 14 produces a clear-cut shadow of the filter to be projected on the photoconductive layer, whereby the imaging device 12 is capable of generating a color composite TV video signal as an output signal thereof even when supplied with the bias light only.

In accordance with the present invention, the first bias light supply device 10 applies light to the transducer section of the imaging device 12 through the filter by a quantity $P_1$ having an allowable small value within a specific range which improves reproducibility in dark scenes by allowing the carrier color signals input into the demodulators 36 and 38 to be greater than the peak-to-peak value of noise also input into the demodulators 36 and 38. Therefore, if shading occurs dark scenes due to the light from the first bias light supply device 10, it will be negligible in practice. Also, the destroyed white balance due to the change in the quantity and/or color temperature of the light from the device 10 with the lapse of time will be negligible.

Referring to FIGS. 1 and 2, the second bias light supply device 11 comprises a milk white annular member 70 fit on the outer periphery of the wall of the image tube 12, and a plurality of light emitting diodes (LEDs) or lamps 72 embedded in the annular member 70. When the LEDs 72 are energized, light emanating from the milk white annular member 70 will propagate through the space between the surface of an electrode (electron gun) disposed in the tube 12 and the inner surface of the tube wall and the space between the outer and inner surfaces of the tube wall, while being repeatedly reflected by the various surfaces. The bias light propagating in this manner will irradiate the entire surface of the transducer section from behind in an even distribution.

A practical construction of the second bias light supply device 11 will be described in detail with reference to FIGS. 4 and 5 together with a practical construction of the imaging device 12.

Figure 4:
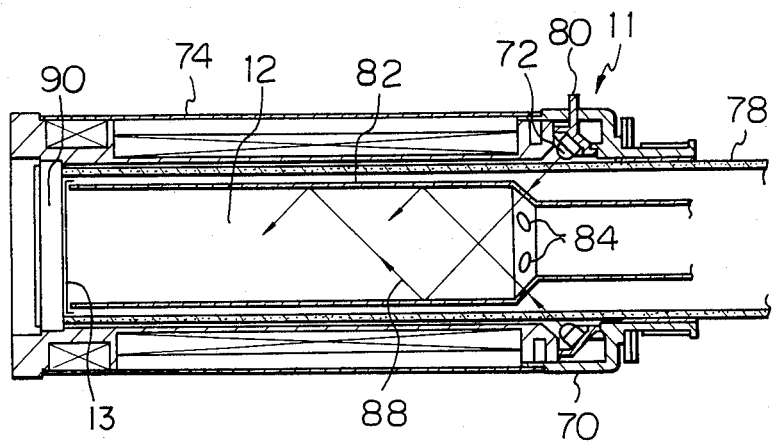
FIG. 4 is a view of a practical construction of a second bias light supply device and a color TV imaging device.
Figure 5:
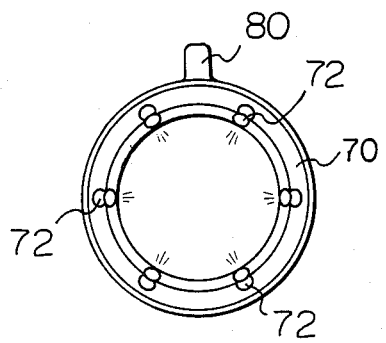
FIG. 5 is a view of a light source included in the second bias light supply device of FIG. 4.

As shown in FIG. 4, the imaging device 12 is fixed in place within a deflecting coil 74. A plurality of LEDs or lamps 72 are mounted on the annular member 70 for emitting bias light each at a predetermined angular spacing. The inside diameter of the circle defined by the angularly spaced lamps 72 is predetermined to be somewhat larger than the outside diameter of a glass tube 78 of the imaging device 12. The lamps 72 are built behind the deflecting coil 74 in such a manner as to be rotatable over a predetermined angle relative to the imaging device 12.

A tongue 80 extends radially outwardly from the annular member 70 to allow the angular position of the lamps 72 to be adjusted from outside. A tubular electrode 82 is disposed in the imaging device 12 which is mounted in the deflecting coil 74. The electrode 82 is formed with a plurality of apertures 84 at the rear end thereof, while being provided with a photoelectric transducer surface 13 at the front end thereof.

In operation, a predetermined electrode voltage is applied to the imaging device 12 while a grid (not shown) is operated to adjust a beam current thereof to a predetermined value. Thereafter, the lamps 72 are energized to emit bias light in the form of small beams 88 so that the bias light may propagate toward the transducer surface 86 of the electrode 82. Then, a signal corresponding to a dark current $I_d$ is picked up at a target ring 90. (In this connection, experiments showed that this embodiment sufficiently improves the afterimage situation with a dark current Id on the order of 10 nA.) The bias light 88 emanating from the lamps 72 enters the electrode 82 through the apertures 84 in the rear end of the electrode 82 so as to propagate as far as the transducer surface 86 while being repeatedly reflected by its inner peripheral surface.

As described above, the second bias light supply device 11 applies light to the transducer surface 86 from behind by a quantity $P_2$ which substantially reduces afterimages. (Usually, the quantity $P_2$ is larger than the previously mentioned quantity $P_1$. An output signal of the imaging device 12 is 5 nA, for example, for the quantity of light $P_1$ and 25 nA for the quantity of light $P_2$.) This suppresses afterimages in the imaging device 12. Therefore, the imaging apparatus of the present invention effectively eliminates the drawbacks heretofore encountered; the apparatus shown in FIG. 1 is capable of generating a color TV video signal which will construct a reproduced image with a desirable quality. That is, as shown in FIG. 1, the light from the first bias light supply device 10 is applied to an image of an object which is focused by the lens 20 to the photoconductive layer of the transducer section in the imaging device 12. The photoconductive layer is conditioned to be capable of producing an output signal with afterimages reduced by the radiation of light from the second bias light supply device 11.

If the light issuing from the first bias light supply device 10 has a color temperature of 3,200° K., a change in its quantity will not disturb white balance. The light from the first bias light supply device 10 may have such a color temperature as to develop great carrier color signals in the output signal in the imaging device 12, efficiently improving color reproducibility of dark scenes by means of a smaller quantity of light.

In summary, it will be seen that the present invention provides a color TV imaging apparatus which efficiently attains improvement in the color reproducibility in dark scenes and reduction of afterimages, while confining the influence of a change in the quantity of bias light from the first device 10 as well as shading in dark scenes to a practically negligible range.

Various modifications will become possible for those skilled in the art after receiving the teachings of the present disclosure without departing from the scope thereof.

What is claimed is:

1. A color television imaging apparatus for improving color reproducibility in dark scenes and reducing afterimages, comprising:
    a color television imaging device for generating a multiplex color television video output signal, said device including a photoelectric transducer section and a color separation stripe filter;
    first bias light supply means for applying a first bias light, which improves color reproducibility in dark scenes, to the transducer section of the imaging device through the stripe filter, said first bias light supply means being located in front of the transducer section which is positioned in a front portion of the imaging device; and
    second bias light supply means for applying a second bias light, which reduces afterimages, to the transducer section of the imaging device, said second bias light supply means being located in a rear portion of the imaging device and facing the transducer section.

2. A color television imaging apparatus as claimed in claim 1, in which the first bias light supply means can be adjusted to vary the quantity and color temperature of the first bias light.

3. A color television imaging apparatus as claimed in claim 2, in which the first bias light supply means is adjusted to provide the minimum quantity of the first bias light which is necessary for improving color reproducibility in dark scenes.

4. A color television imaging apparatus as claimed in claim 3, in which the quantity of the second bias light is larger than the quantity of the first bias light.

5. A color television imaging apparatus as claimed in claim 2, in which the color temperature of the first bias light is adjusted to be about 3,200° K.

* * * * *